March 18, 1930.    G. G. CHEAKAS ET AL    1,750,922
SEPARATING DEVICE
Filed April 17, 1928    2 Sheets-Sheet 2
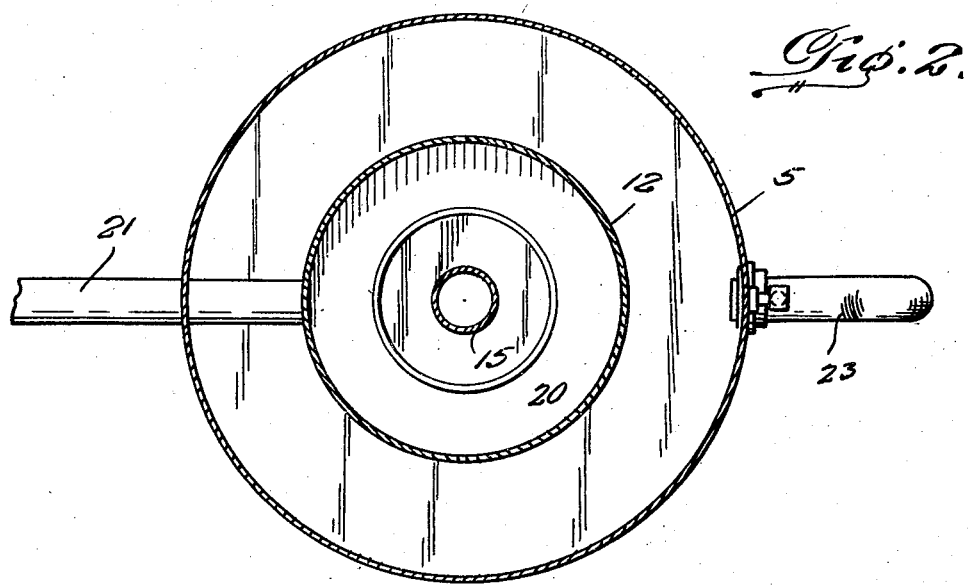
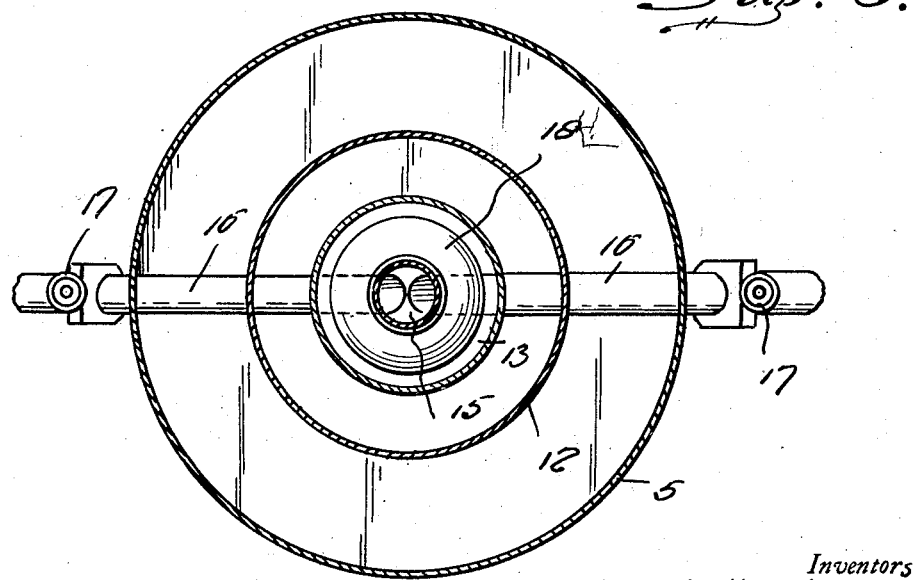
Inventors
G. G. Cheakas,
J. H. Martin,
By Clarence A. O'Brien
Attorney Patented Mar. 18, 1930

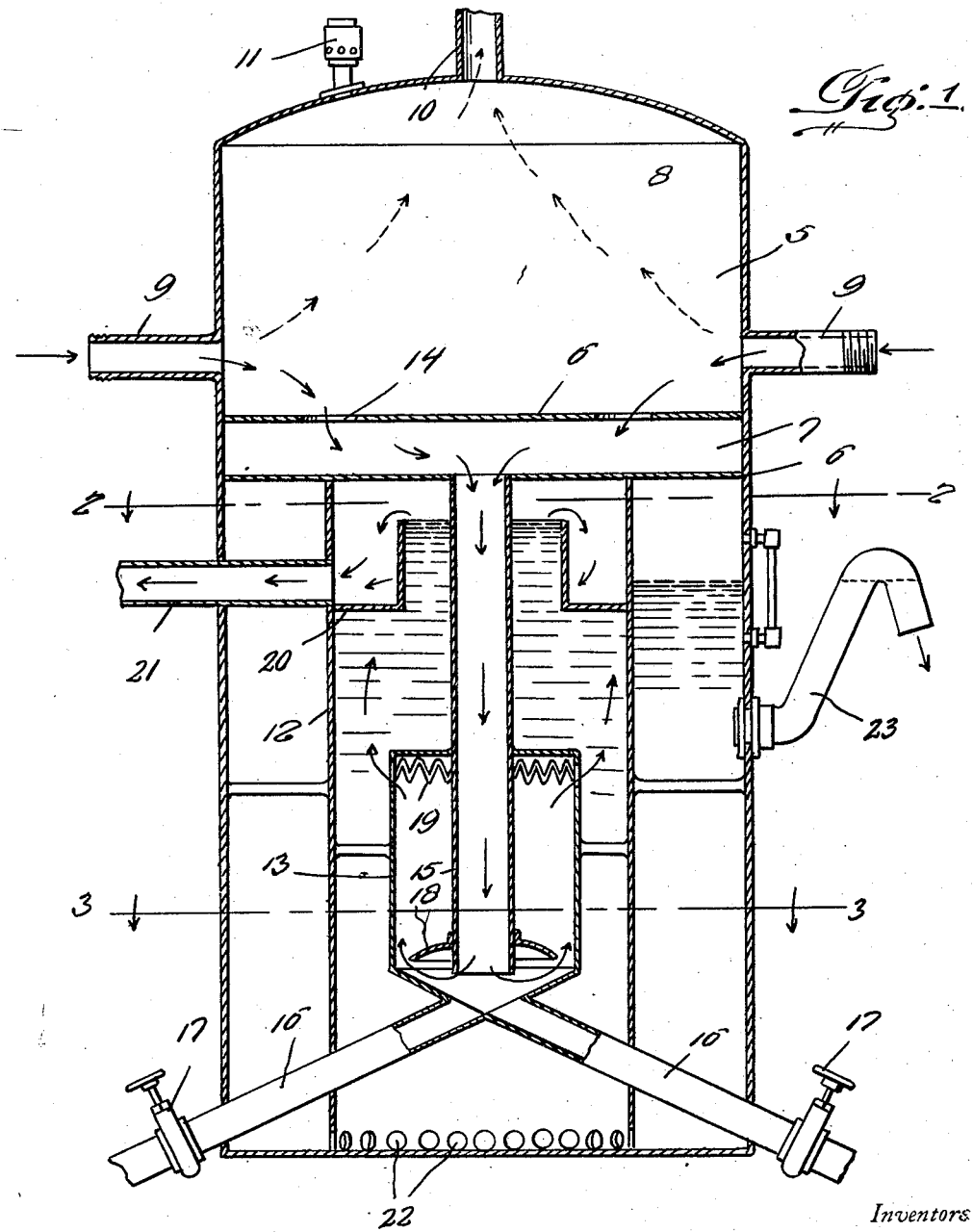

1,750,922

UNITED STATES PATENT OFFICE

GEORGE G. CHEAKAS AND JOHN HENRY MARTIN, OF WICHITA FALLS, TEXAS, ASSIGNORS OF ONE-THIRD TO R. R. FISK, OF WICHITA FALLS, TEXAS

SEPARATING DEVICE

Application filed April 17, 1928. Serial No. 270,714.

This invention relates to new and useful improvements in separators and aims to provide means whereby oil may be thoroughly separated from water, sand and other foreign matter and this without requiring the passage of the same through expensive and complicated separating devices which usually necessitates the constant attention of several operators.

Our device is so constructed that when the oil is passed therein the natural flow of the oil will cause the separation of the same from any water, sand or other foreign matter, which water or sand are easily taken from the device.

In the drawings wherein like reference characters indicate corresponding parts throughout the several views:

Figure 1 is a detail vertical section through our separating device, and

Figures 2 and 3 are horizontal sections taken substantially upon the lines 2—2 and 3—3 respectively of Figure 1.

Now having particular reference to the drawings, our novel device consists in a relatively large capacity tank 5 within the upper end of which is a pair of spaced horizontal walls 6, 6 for providing a chamber therebetween that area of the tank above the uppermost wall 6 providing a gas collecting chamber 8 leading into which are oil inlet pipes 9, 9. The upper end of the tank 5 is equipped with a gas outlet pipe 10 to reduce pressure therein said upper wall being also provided with a suitable blow-off valve 11. Arranged perpendicularly within the center of the tank 5 beneath the lowermost horizontal wall 6 is a secondary tank 12 while arranged and suitably supported therein intermediate its ends is a trap chamber 13. The top horizontal wall 6 is provided with a plurality of oil inlets 14 while depending from the chamber 7 between said walls 6, 6 and terminating at its lower end within the lower end of the trap chamber 13 is a supply pipe 15 for said trap chamber.

Extending diagonally downwardly in opposite directions from the bottom wall of the trap chamber 13 are sediment clean out pipes 16, 16, that extend through the secondary tank 12 and the main tank 5 the outer ends thereof being equipped with suitable gate valves 17, 17. Arranged upon the lower end of the pipe 15 in spaced relation with the bottom of the trap chamber 13 is a suitable baffle plate 18 while the upper end of the trap chamber 13 is formed with a zig-zag slot 19 to permit the oil and water to flow therefrom into the secondary tank 12. Constructed within the upper end of this secondary tank 12 is a chamber or trough 20 having communication with said secondary tank 12 so that oil naturally flowing upwardly within said secondary tank will flow therein and be taken off through a drain pipe 21 leading through the tank 5 and having communication with the bottom of said trough or chamber. The lower end of the secondary tank 12 is provided with a plurality of openings 22 to enable the water to flow into the tank 5 around said secondary tank which water is drawn off through a pipe 23 having communication with the interior of the tank at a point below the upper end of the secondary tank 12 so as to allow the raising and lowering of the water level which is deemed a necessity.

In view of the foregoing description when considered in conjunction with the accompanying drawings it will be apparent that we have provided a very novel, simple and useful separating device whereby water and sediment may be properly and inexpensively separated from oil, and even though we have herein shown and described the invention as consisting of certain detail structural elements it is nevertheless to be understood that some changes may be made therein without affecting the spirit and scope of the appended claims.

Having thus described our invention, what we claim is:—

In a separator of the class described, a tank, a horizontal partition therein dividing the same into upper and lower chambers, a secondary tank arranged within the lower chamber, a trap chamber arranged within the intermediate portion of the secondary chamber and being spaced from the wall thereof, a pipe extending downwardly through the secondary tank, the lower end of said pipe extending into the trap chamber, the upper end of said pipe having communication with the upper chamber, oil inlet pipes having communication with the upper chamber, sediment drain pipes extending downwardly in diverging relation from the bottom of the trap chamber through the secondary and main tanks, the upper portion of the trap chamber being provided with a discharge opening to permit oil and water to flow into the secondary tank, a trough arranged within the upper portion of the secondary tank and surrounding said vertical pipe for receiving the oil only that collects in the upper portion of the secondary tank, an oil take off pipe leading from the trough through the tanks, the lower end of the secondary tank having water discharge passages, and a water take off pipe extending from the main tank.

In testimony whereof we each affix our signatures.

GEORGE G. CHEAKAS.
JOHN HENRY MARTIN.